(12) United States Patent
Rakshit

(10) Patent No.: US 10,261,470 B2
(45) Date of Patent: Apr. 16, 2019

(54) EXTENDED PROJECTION BOUNDARY OF HOLOGRAPHIC DISPLAY DEVICE

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 15/610,695

(22) Filed: Jun. 1, 2017

(65) Prior Publication Data

US 2018/0348705 A1    Dec. 6, 2018

(51) Int. Cl.
    *G03H 1/04*      (2006.01)
    *G03H 1/22*      (2006.01)
    (Continued)

(52) U.S. Cl.
    CPC ............. *G03H 1/2205* (2013.01); *G02B 3/14* (2013.01); *G02B 26/004* (2013.01); *G03H 2001/221* (2013.01)

(58) Field of Classification Search
    CPC .................. G03H 1/00; G03H 1/0005; G03H 2001/0061; G03H 1/08; G03H 1/0866; G03H 2001/0883; G03H 1/0891; G03H 1/16; G03H 1/22; G03H 2001/221; G03H 2001/2223; G03H 2001/2234;
(Continued)

(56) References Cited

U.S. PATENT DOCUMENTS

| | | | |
|---|---|---|---|
| 7,755,840 B2 * | 7/2010 | Batchko | G02B 3/14 359/665 |
| 9,098,113 B2 * | 8/2015 | Brokken | G06F 3/016 |

(Continued)

FOREIGN PATENT DOCUMENTS

| | | |
|---|---|---|
| CN | 203012344 | 6/2013 |
| CN | 203587976 | 5/2014 |

OTHER PUBLICATIONS

Purcher, Patently Mobile; "Samsung Invents a Holographic Device and Specialized Display"; http://www.patentlymobile.com/2015/06/samsung-invents-a-holographic-device-and-specialized-display.html; posted Jun. 1, 2015; 4 pages.

(Continued)

*Primary Examiner* — Arnel C Lavarias
(74) *Attorney, Agent, or Firm* — George R. McGuire; Bond Schoeneck & King, PLLC; John Pivnichny

(57) ABSTRACT

A system and method for extending a projection boundary for a holographic display device. The system includes a display device with electroactive polymer strips attached to the bottom of the display device and two microfluidic display layers affixed to the top. The two microfluidic display layers have holographic projectors therebetween. Light is projected from the holographic projects through the second microfluidic layer and holographic objects are created where the projected light converges. A user changes the dimensions or location of a holographic object using finger gestures. The system calculates the focal length required to make the change instructed by the user and the microfluidic display layers deform to create a convex lens in the second microfluidic layer with the focal length required to make the change instructed by the user.

17 Claims, 7 Drawing Sheets

(51) Int. Cl.
  *G02B 26/00* (2006.01)
  *G02B 3/14* (2006.01)
(58) Field of Classification Search
  CPC ... G03H 2001/2236; G03H 2001/2239; G03H 2001/2242; G03H 2223/00
  USPC .................. 359/1, 9, 13, 14, 29, 32, 33, 35
  See application file for complete search history.

(56) References Cited

U.S. PATENT DOCUMENTS

| | | | |
|---|---|---|---|
| 9,230,500 B2 | 1/2016 | Yang et al. | |
| 2012/0170089 A1 | 7/2012 | Kim et al. | |
| 2013/0280752 A1* | 10/2013 | Ozcan | G01N 21/4795 435/29 |
| 2016/0048170 A1 | 2/2016 | Kim et al. | |
| 2016/0147081 A1* | 5/2016 | Kilcher | G02B 27/40 359/13 |

OTHER PUBLICATIONS

Rossignol, "Apple granted patent for interactive holographic display device"; http://www.iphonehacks.com/2014/09/appl e-patent-interactive-hol ographic-displ ay-device.html; posted Sep. 30, 2014; 6 pages.
Russon, "Touchable 3D holograms in daylight now possible using superfast femtosecond lasers"; http://www.ibtimes.co.uk/touchable-3d-holograms-daylight-now-possible-using-superfast-femtose-lasers-1508599; updated Jun. 30, 2015; 3 pages.
Cervantes, "Samsung tiles patent for smartphone that can display holographic images"; http://www.androidauthority.com/samsung-patent-smartphone-holographic-images-633167/; Aug. 11, 2015; 4 pages.
Tweedie, "This Laser Can Create 3D Holograms in the Daylight"; Business Insider India; http://www.businessinsider.in/This-Laser-Can-Create-3D-Holograms-In-The-Daylight/articleshow/45040514.cms; Nov. 5, 2014; 9 pages.
Murphy, "Scientists have created 3D holograms that you can touch"; Quartz; https://qz.com/438880/scientists-have-created-3d-holograms-that-you-can-touch/; Jun. 27, 2015; 4 pages.
Huang, "Artificial muscles made of electroactive polymers impart lifelike movements to biomedical and robotic Devices"; Electroactive Polymers—MIT Technology Review; https://www.technologyreview.com/s/401750/electroactive-polymers/; Dec. 1, 2002; 6 pages.
Nikon Lens Specifications; http://www.photosynthesis.co.nz/nikon/specs.html; 30 pages, Retrieved May 31, 2017.
Laur, "Galaxy S7 will feature a flexible display and a flexible body"; Flexible Display News and Information; http://www.flexible-display.net/; Jul. 13, 2015; 17 pages.
Van Biezen, "Physics—Optics: Lenses (1 of 5) Lens Combinations—Two Converging Lenses"; YouTube; https://www.youtube.com/watch?v=aHHa0cK_3as; published Apr. 30, 2013; 4 pages.
Edwards, "Holograms are finally here: Plasma lasers used to create images in mid-air"; Pocket-lint; http://www.pocket-lint.com/news/131622-holograms-are-finally-here-plasma-lasers-used-to-create-images-in-mid-air; Nov. 5, 2014.
Wikipedia the Free Encyclopedia; "Electroactive polymers"; https://en.wikipedia.org/wiki/Electroactive_polymers; 10 pages, Retrieved Jun. 1, 2017.

\* cited by examiner

EXTENDED PROJECTION BOUNDARY OF HOLOGRAPHIC DISPLAY DEVICE

BACKGROUND

The present invention relates generally to holographic display devices, and more particularly to extending projection boundaries of holographic display devices.

A hologram is a photographic recording of a light field, rather than of an image formed by a lens. Holograms can be displayed as a fully three-dimensional image of its subject matter, and this three-dimension image can typically be observed without the aid of special glasses or other intermediate optical equipment. Holograms typically include an encoded light field as an interference pattern of seemingly random variations in the opacity, density, or surface profile of the photographic medium. When correctly lit, the interference pattern diffracts the light into a reproduction of the original light field. In this way, objects that were in the original light field at the time the hologram was taken appear as three-dimensional images, and typically exhibit visual depth cues such as parallax and perspective that change realistically with any change in the relative position of the observer. Some forms of holography use laser light for illuminating the subject matter when the hologram is taken and also for viewing the hologram. Some holograms are entirely computer-generated and show objects or scenes that never existed.

Holography and other forms of making a three dimensional image will be collectively referred to herein as "three-dimensional imagery." It is noted that "three-dimensional imagery," as that term is used herein does not include imagery techniques where an image projected from, or onto, a two dimensional screen appears to be three dimensional.

As per recent technology, 3D holographic objects can be created in mid-air, as in the example shown in FIG. 1. A user can perform various interactions with the created 3D holographic objects. Holographic objects can be created by multiple holographic projectors coordinating with each other. Such a system will have a wide range area where a holographic object can be projected. Mobile devices are also capable of project holographic objects in the air, which limits the degree of freedom of the holographic projectors. Because the structure of the mobile device is fixed, holographic objects are created within a defined volumetric space, even with various combinations of micro-lens configurations.

Microfluidic lenses (sometimes herein referred to as "microfluidic layers") are known. Microfluidic lenses can be dynamically adjusted with respect to their optical characteristics (for example, zoom or focal length).

SUMMARY

The present invention is a system and method for extending the projection boundary of a holographic display device. The system is a flexible display with automatic bending capabilities and configuration of liquid lens parameters. The microfluidics within the display device can control valves and change lens specifications dynamically without adding different types of lenses. Because different types of lenses may be created dynamically with the system, the volumetric boundaries of holographic objects created by the display device generate a wider range of holographic space and provides for better user interaction.

An embodiment of the holographic display system includes a display device with one or more electroactive polymer (EAP) strips attached to the bottom. The display device also has a first microfluidic display layer and a second microfluidic display layer affixed to the top. One or more holographic projectors are between the first microfluidic display layer and the second microfluidic display layer. The holographic projects emit light that projects through the second microfluidic display layer. Holographic objects are generated based on where the projected light converges and diverges.

In another embodiment, the microfluidic layers can be deformed through the application of pressure. By applying pressure to the first microfluidic layer, the height of an opposing parallel section of the second microfluidic layer increases. The increase in height of this section forms a convex lens, which alters the path of the projected light.

In one embodiment, the system may receive gestures from a user that represent a change in the dimensions or location of the holographic objects. In response to the gestures, the system calculates a focal length required to make the change requested by the user. Then, a portion of the holographic display device deforms in order to generate a convex lens section having the focal length required. For example, the EAP strips on the bottom of the display device receive the feedback and cause the height of a section of the microfluidic display layers to increase, thereby creating a new convex lens to direct the projected light in a new direction.

According to an aspect of the present invention, a holographic display device includes: a first microfluidic layer with a set of optical characteristic(s) that can be varied; a set of three-dimensional imagery projector(s) structured and connected to emit visible radiation corresponding to three-dimensional images; and a control module. The control module includes machine logic is structured, programmed and connected to control optical characteristics of the first microfluidic layer. The control module includes machine logic is structured, programmed and connected to provide an input signal to the set of three-dimensional imagery projector(s), with the input signal corresponding to a three-dimensional image. The first microfluidic layer and the set of three-dimensional imagery projectors are located and oriented with respect to each other so that the visible radiation emitted by the set of three-dimensional imagery projectors passes through the first microfluidic layer.

According to a further embodiment of the present invention, a holographic display device includes: a first microfluidic layer with a set of optical characteristic(s) that can be varied; a set of three-dimensional imagery projector(s) structured and connected to emit visible radiation corresponding to three-dimensional images; a control module; an actuation assembly; and a flexible base layer. The control module is structured, programmed and connected to control optical characteristics of the first microfluidic layer. The control module is further structured, programmed and connected to provide an input signal to the set of three-dimensional imagery projector(s), with the input signal corresponding to a three-dimensional image. The first microfluidic layer and the set of three-dimensional imagery projector(s) are located and oriented with respect to each other so that the visible radiation emitted by the set of three-dimensional imagery projectors passes through the first microfluidic layer. The flexible base layer located to be parallel with and spaced apart from the first microfluidic layer. The set of three-dimensional imagery projector(s) are located between the first microfluidic layer and the flexible base layer. The actuation assembly is structured, located and connected to actuate the first microfluidic layer and the set of three-dimensional imagery projector(s) between the first position and the second position.

According to a further embodiment of the present invention, a holographic display device includes: a set of three-dimensional imagery projector(s) structured and connected to emit visible radiation corresponding to three-dimensional images; a control module; an actuation assembly; and a flexible base layer. The control module is structured, programmed and connected to provide an input signal to the set of three-dimensional imagery projector(s), with the input signal corresponding to a three-dimensional image. The set of three-dimensional image projector(s) are mechanically connected to the flexible base layer. The actuation assembly is structured, located and connected to actuate the flexible base layer and the set of three-dimensional imagery projector(s) to flex between at least a first position and the second position to change a position in space of three-dimensional images displayed by the device.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
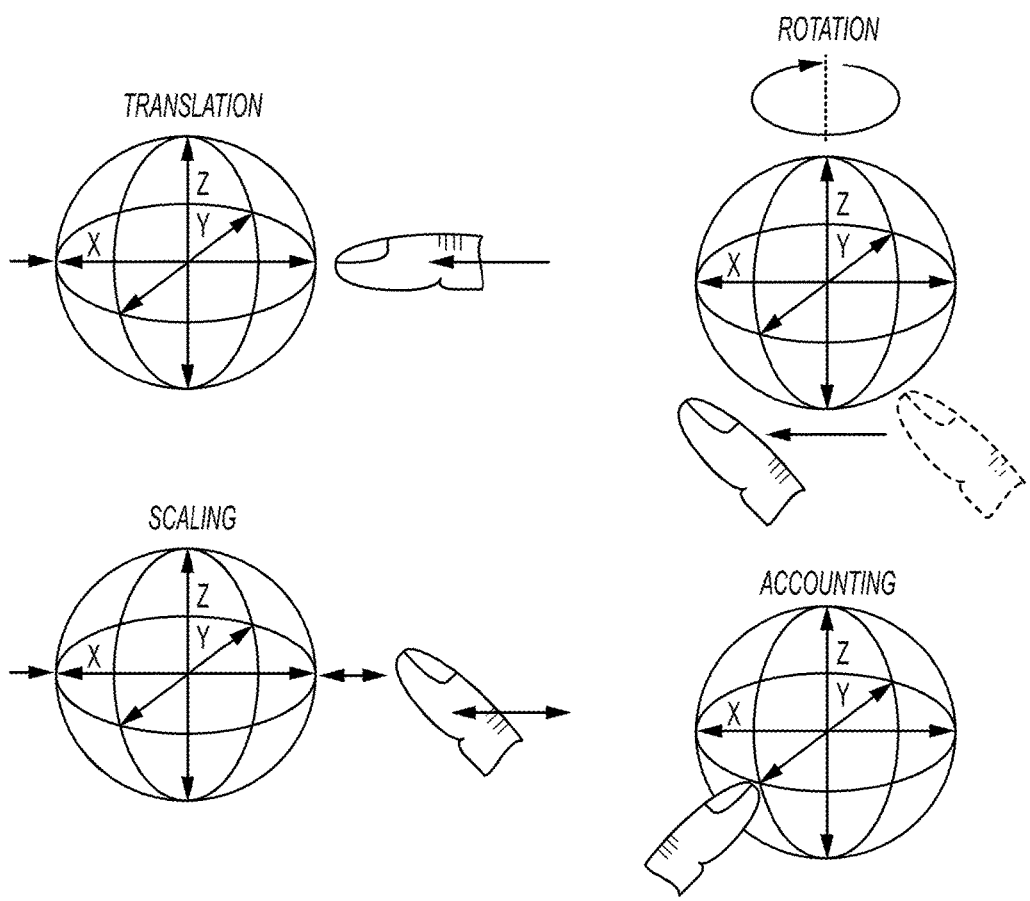
FIG. 1 is a diagram of 3D holographic objects created mid-air.

Referring to the Figures, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
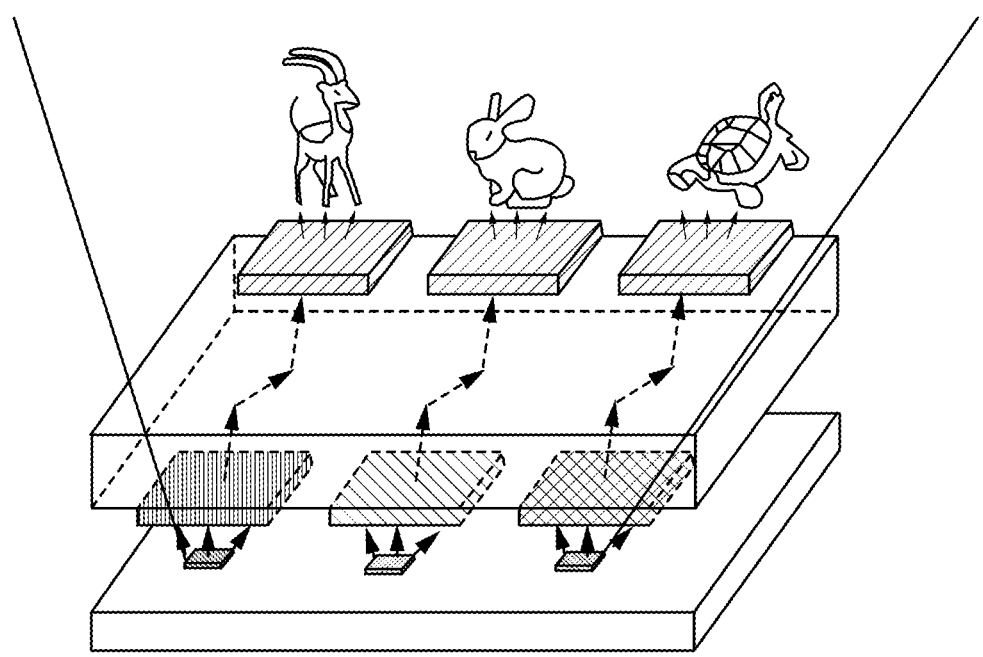
FIG. 2 is a diagram of a rigid display device.

Some embodiments of the present invention may recognize one, or more, of the following facts, problems and/or opportunities for improvement with respect to the state of the art: (i) a rigid display device is shown in FIG. 2 (ii) the rigid structure of the mobile device in FIG. 2 has holographic projectors with fixed locations within the display device; (iii) due to the fixed and rigid structure of the display device and its holographic projectors, holographic objects can only be created within a limited boundary and direction; (iv) therefore, there is a need for a display device that affords a greater degree of freedom to the holographic projectors within the display; (v) thus, the boundary and direction holographic objects around the display are increased; and/or (vi) holographic objects have wide application is education space, so increasing the projection boundary from a display will add value during projecting holographic objects in three-dimensional space.

Figure 3:
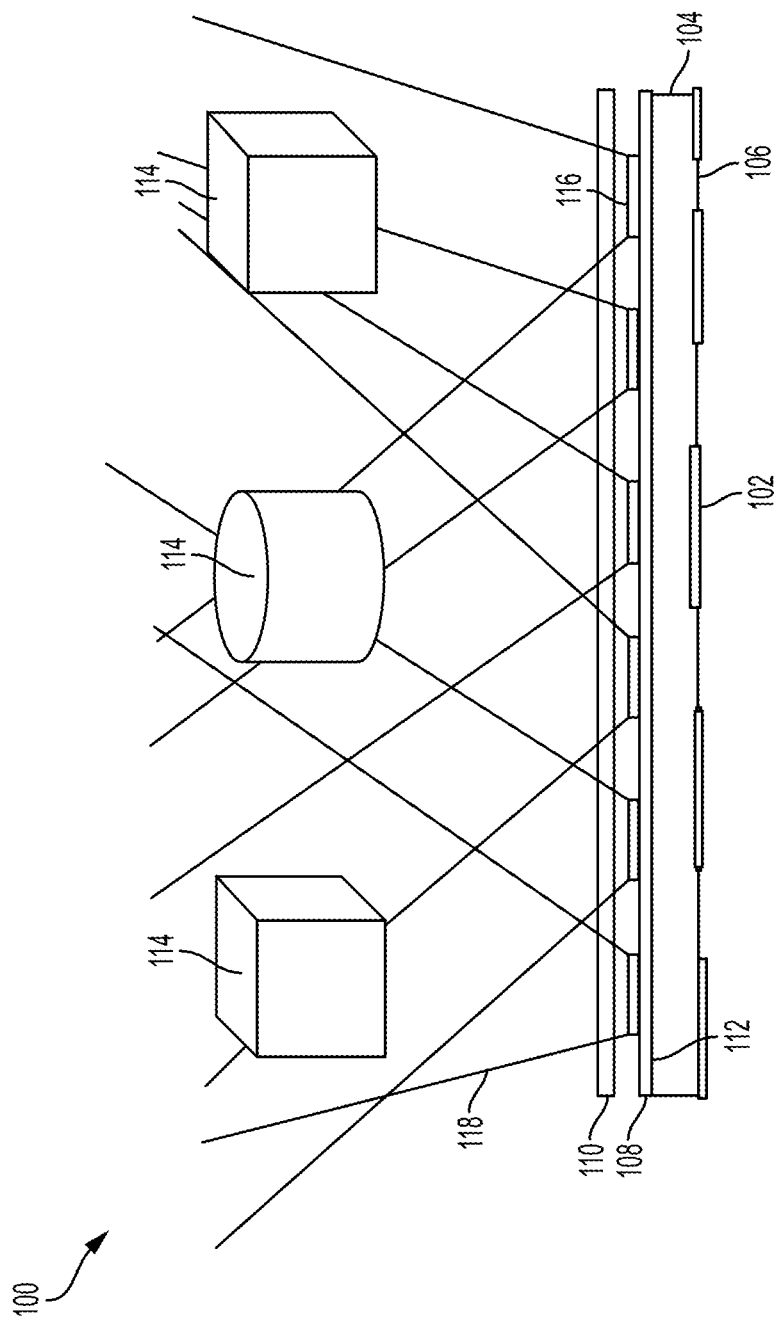
FIG. 3 is a diagram of a non-limiting illustrative embodiment of the system.

Referring again to the drawings, wherein like reference numerals refer to like parts throughout, there is seen in FIG. 3 a diagram of a non-limiting illustrative embodiment of the system 100. The system 100 is a flexible display 104 with automatic bending capabilities and configuration of liquid lens parameters. The microfluidics within the display device 104 can control valves and change lens specifications dynamically without adding different types of lenses. As shown in the depicted embodiment, electroactive polymer (EAP) strips 102 are attached at the bottom 106 of a display device 104. A first microfluidics display panel layer 108 and a second microfluidics display panel layer 110 are fixed to the top 112 of the display device 104. Based on the required structure, shape, dimension, and position of the holographic objects 114, EAP strips 102 are deformed in such a way that the surface profile of the display device 104 is changed and accordingly, the relative positions of the holographic projectors 116 are dynamically changed. The machine logic that controls the properties of the microfluidic layers is sometimes herein referred to as a control module. The control module also controls the signal input to the holographic projector(s) to make the three-dimensional display.

The first microfluidics display panel layer 108 is one type of flexible base layer that can be used to raise the height of the holographic projectors 116 to create additional deformation on the display device 104. The increase in height also changes the direction of the holographic projectors 116, which increases the degrees of movement freedom of the holographic projectors 116. The second microfluidic display layer 110 deforms to create a lens effect on the projected light 118. Based on the required shape and dimensions of the holographic object 116, the system calculates the required focal length. Then, the second microfluidics layer 110 is raised to the required focal length in order to create the desired lens effect on the projected light 118. Thereafter, a user can interact with the holographic objects 114. For example, the user may change the dimensions and direction of a holographic object 114. Based on the user changes, the system dynamically identifies the deformation required by the EAP strips 102 or first microfluidic display layer 108, or the lens effect from the second microfluidic display layer 110. In this embodiment, device 104 and microfluidic layer 108 collectively form an embodiment of a "flexible base layer."

Still referring to FIG. 3, it is shown that the EAP strips 102 and microfluidic display layers 108, 110 add degrees of freedom to the holographic projectors 116. Accordingly, the holographic objects 114 can be created in wide field of view. A wide field of view helps the user control the holographic objects 114 in the wide area using finger gestures or any other navigation method. The lens effect generated by the second microfluidic display layer 110 creates dynamic structural, shape, and position changes of the holographic objects 114 by converging or diverging the direction of the projected light 118.

Figure 4:
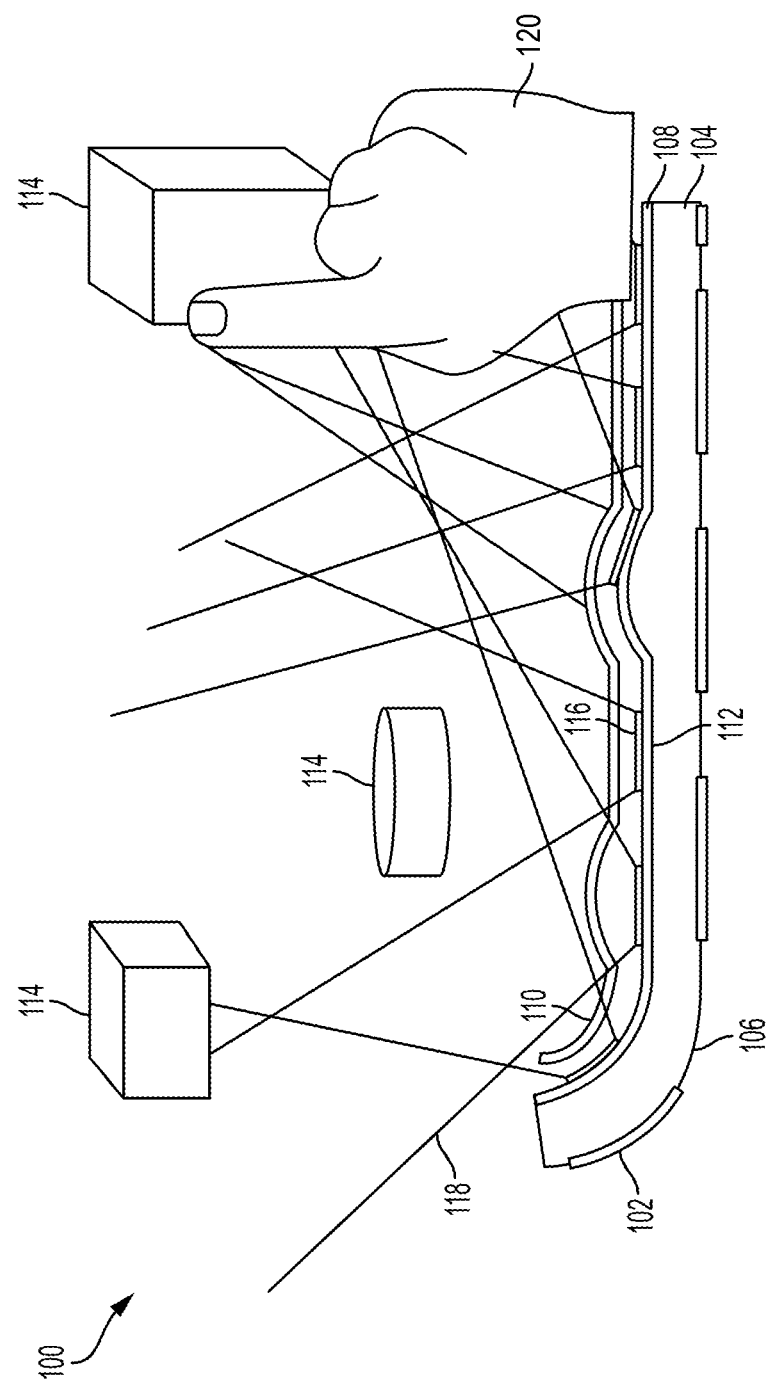
FIG. 4 is a diagram of a non-limiting illustrative embodiment of the system during deformation.

Referring now to FIG. 4, there is shown a diagram of a non-limiting illustrative embodiment of the system 100 during after deformation. As shown in the depicted embodiment, the EAP strips 102 deform and cause the deformation of the display device 104 such that the direction of projected light 118 from the display device 104 changes. In this embodiment, the EAP strips are part of an actuation assembly that moves portion(s) of the device to change the location of the displayed image. Other types of actuation assemblies (now known or to be developed in the future) are possible. The direction of the projected light 118 can also be changed by raising the height of the microfluidic display layers 108, 110. The second microfluidic display layer 110 creates a lens effect on the projected light 118. If the height of the second microfluidic display layer 110 increases, then transparent liquid will create a lens effect on the projected light 118. Raising the height of the first microfluidic display layer 108 also changes the direction of the holographic projector 114, which changes the direction of the projected light 118. When the direction of the projected light 118 is changed, the dimensions, shape, and location of the holographic objects 114 are changed. Thus, a user can change the position, dimension, and shape of a holographic object 114 with finger gesture 120. In response to the finger gesture 120, the structure of the display device 104 changes automatically and the shape of the holographic object 114 required by the finger gesture 120 will be created.

Figure 5:
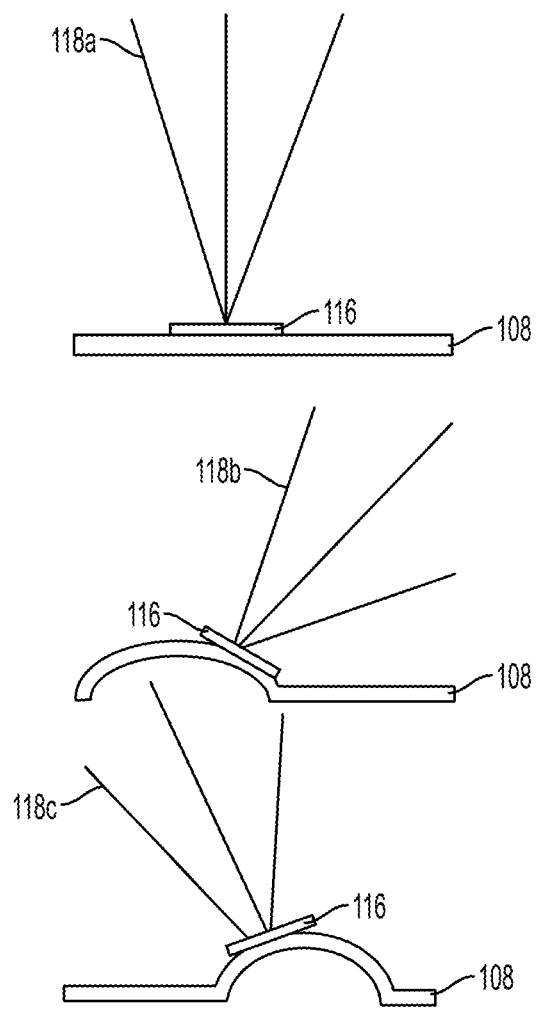
FIG. 5 is a diagram of a non-limiting illustrative embodiment of directional changes of projected light.

Referring now to FIG. 5, there is shown a diagram of a non-limiting illustrative embodiment of directional changes of projected light. The projected light 118*a* is first shown where there is no raised height location on the first microfluidic display layer 108. Next, the projected light 118*b* is shown angled to a first side when there is a first change in the height of the first microfluidic display layer 108. Finally, the projected light 118*c* is shown angled to a second side when there is a second change in the height of the first microfluidic display layer 108. Therefore, the direction of the projected light 118 can be changed based on the magnitude and position of raise in the first microfluidic display layer 108. The system dynamically calculates the position and direction of a holographic object 114 based on finger gesture 120 and alters the shape of the display device 104 accordingly.

Figure 6:
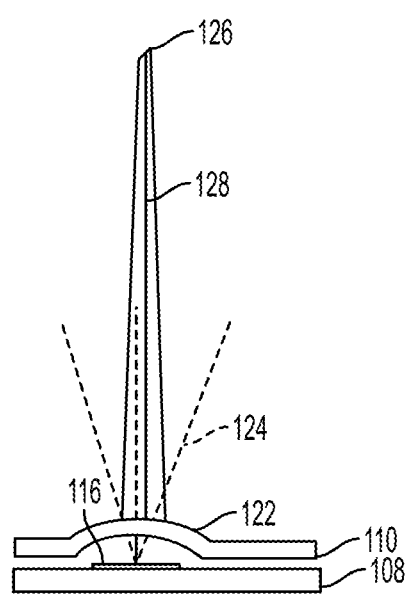
FIG. 6 is a diagram of a non-limiting illustrative embodiment of the lens effect created by the second microfluidic display layer.

Referring now to FIG. 6 there is shown a diagram of non-limiting illustrative embodiment of the lens effect created by the second microfluidic display layer. In the depicted embodiment, a convex liquid lens 122 created by a raise in the second microfluidic display layer 110 is shown. The convex lens 122 produces a lens effect that changes the path of the projected light absent the lens (see, reference numeral 124) to pass through focal point 126 characterized by focal length 128.

Figure 7:
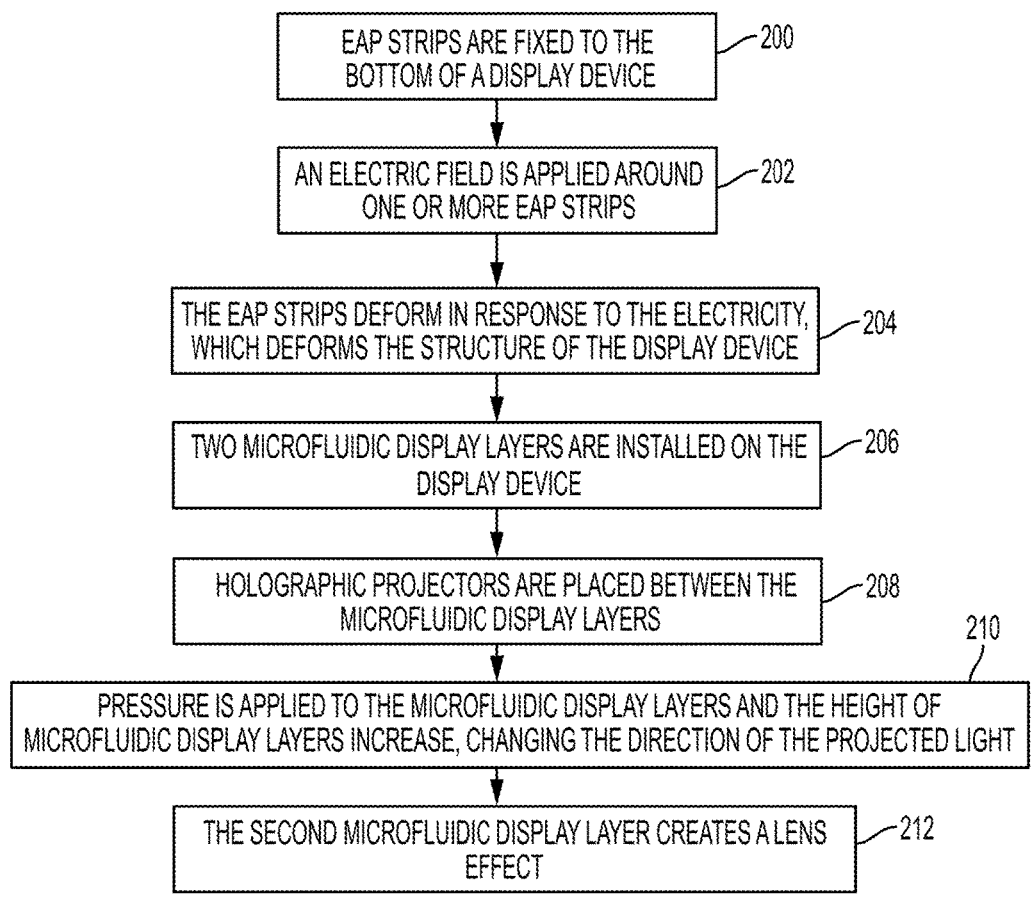
FIG. 7 is a flowchart of a non-limiting illustrative embodiment of a method for extending a projection boundary of a holographic display device.

Referring now to FIG. 7, there is shown a flowchart of a non-limiting illustrative embodiment of a method for extending a projection boundary of a holographic display device. First, at step 200, EAP strips are fixed to the bottom of the display device. Next, at step 202, an electric field is applied around any EAP strip. Thereafter, at step 204, the EAP strips will deform in response to the electricity, which deforms the structure of the display device accordingly. Then, at step 206, two microfluidic display layers are installed, a first microfluidic display layer sandwiched between a second microfluidic display layer and the surface of the display device. Next, at step 208, holographic projectors are placed between the second microfluidic display layer and the first microfluidic display layer. Then, at step 210, appropriate pressure is applied on the first microfluidic display layer. In response to the pressure, the height of the second microfluidic display layer increases and the direction of the projected light changes accordingly. Next, at step 212, the second microfluidic display layer creates a lens effect. Once the height is raised at the top layer, the surface profile will be changed and the projected light will travel through the top layer. Once the surface profile is changed, a lens effect will be created on the projected light.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A holographic display device comprising
   a first microfluidic layer with a set of optical characteristic(s)that can be varied;
   a set of three-dimensional imagery projector(s)structured and connected to emit visible radiation corresponding to three-dimensional images; and
   a control module;
   wherein:
      the control module is structured, programmed and connected to control optical characteristics of the first microfluidic layer;
      the control module includes is further structured, programmed and connected to provide an input signal to the set of three-dimensional imagery projector(s), with the input signal corresponding to a three-dimensional image; and
      the first microfluidic layer and the set of three-dimensional imagery projector(s)are located and oriented with respect to each other so that the visible radiation emitted by the set of three-dimensional imagery projector(s)passes through the first microfluidic layer.

2. The device of claim 1 wherein the first microfluidic layer and the set of three dimensional imagery projector(s) are structured and connected so that they can be flexed between at least a first position and a second position.

3. The device of claim 2 further comprising an actuation assembly structured, located and connected to actuate the first microfluidic layer and the set of three-dimensional imagery projector(s) between a first position and a second position.

4. The device of claim 3 wherein the actuation assembly includes piezoelectric material.

5. The device of claim 3 wherein the actuation assembly includes electroactive polymer strips.

6. The device of claim 1 wherein the three-dimensional imagery projector(s) are holography projector(s) for projecting holographic images.

7. The device of claim 1 wherein the set of optical characteristic(s) includes focal length.

8. The device of claim 1 further comprising a flexible base layer located to be parallel with and spaced apart from the first microfluidic layer, wherein the set of three dimensional imagery projector(s) are located between the first microfluidic layer and the flexible base layer.

9. The device of claim 7 wherein the flexible base layer includes a second microfluidic layer.

10. A holographic display device comprising:
    a first microfluidic layer with a set of optical characteristic(s)that can be varied;
    a set of three-dimensional imagery projector(s)structured and connected to emit visible radiation corresponding to three-dimensional images;
    a control module;
    an actuation assembly; and
    a flexible base layer;
    wherein:
       the control module is structured, programmed and connected to control optical characteristics of the first microfluidic layer;
       the control module is further structured, programmed and connected to provide an input signal to the set of three-dimensional imagery projector(s), with the input signal corresponding to a three-dimensional image;
       the first microfluidic layer and the set of three-dimensional imagery projector(s)are located and oriented with respect to each other so that the visible radiation emitted by the set of three-dimensional imagery projector(s) passes through the first microfluidic layer;

the flexible base layer located to be parallel with and spaced apart from the first microfluidic layer;

the set of three-dimensional imagery projector(s)are located between the first microfluidic layer and the flexible base layer; and the actuation assembly is structured, located and connected to actuate the first microfluidic layer and the set of three-dimensional imagery projector(s) between a first position and a second position.

11. The device of claim 10 wherein the flexible base layer includes a second microfluidic layer.

12. The device of claim 1 wherein the three-dimensional imagery projector(s) are holography projector(s) for projecting holographic images.

13. A holographic display device comprising:
a set of three-dimensional imagery projector(s)structured and connected to emit visible radiation corresponding to three-dimensional images;
a control module;
an actuation assembly; and
a flexible base layer;

wherein:
the control module is structured, programmed and connected to provide an input signal to the set of three-dimensional imagery projector(s),with the input signal corresponding to a three dimensional image;

the set of three-dimensional image projector(s)are mechanically connected to the flexible base layer; and the actuation assembly is structured, located and connected to actuate the flexible base layer and the set of three-dimensional imagery projector(s)to flex between at least a first position and a second position to change a position in space of three-dimensional images displayed by the device.

14. The device of claim 13 wherein the flexible base layer includes a second microfluidic layer.

15. The device of claim 13 wherein the actuation assembly includes piezoelectric material.

16. The device of claim 13 wherein the actuation assembly includes electroactive polymer strips.

17. The device of claim 13 wherein the three-dimensional imagery projector(s) are holography projector(s) for projecting holographic images.

* * * * *